United States Patent
Kushwah et al.

(10) Patent No.: US 10,282,099 B1
(45) Date of Patent: May 7, 2019

(54) INTELLIGENT SNAPSHOT TIERING

(71) Applicant: NetApp, Inc., Sunnyvale, CA (US)

(72) Inventors: Ajay Pratap Singh Kushwah, San Ramon, CA (US); Ling Zheng, Saratoga, CA (US); Sharad Jain, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 62 days.

(21) Appl. No.: 15/796,467

(22) Filed: Oct. 27, 2017

(51) Int. Cl.
*G06F 11/14* (2006.01)
*G06F 3/06* (2006.01)

(52) U.S. Cl.
CPC ............ *G06F 3/0608* (2013.01); *G06F 3/067* (2013.01); *G06F 3/0647* (2013.01); *G06F 11/1451* (2013.01); *G06F 11/1456* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,620,973 B1* | 12/2013 | Veeraswamy | ......... | G06F 16/128 707/822 |
| 9,020,903 B1* | 4/2015 | Vempati | ................ | G06F 12/121 707/674 |
| 9,679,040 B1 | 6/2017 | Davis et al. | | |
| 9,720,835 B1 | 8/2017 | Shilane et al. | | |
| 2016/0231940 A1* | 8/2016 | Tabachnik | .......... | G06F 11/1441 |

OTHER PUBLICATIONS

International Search Report and Written Opinion for Application No. PCT/US2017/059090 dated Feb. 2, 2018, 12 pages.
International Search Report and Written Opinion for Application No. PCT/US2017/059079 dated Feb. 5, 2018, 15 pages.
USENIX Association Berkeley, CA, Jun. 13, 2012, 12 pages, retrieved on Sep. 6, 2016 from https://www.usenix.org/system/files/conference/atc12/atc12-final43.pdf.

* cited by examiner

*Primary Examiner* — Brian R Peugh
(74) *Attorney, Agent, or Firm* — Pepper Hamilton LLP

(57) ABSTRACT

Intelligent snapshot tiering facilitates efficient management of snapshots and efficient restore of snapshots. For intelligent snapshot tiering, a storage appliance can limit cross-tier migration to invalidated data blocks of a snapshot instead of an entire snapshot. Based on a policy, a storage appliance can identify a snapshot to be migrated to another storage tier and then determine which data blocks are invalidated by an immediately succeeding snapshot. This would limit network bandwidth consumption to the invalidated data blocks and maintain the valid data blocks at the faster access storage tier since the more recent snapshots are more likely to be restored.

15 Claims, 5 Drawing Sheets

INTELLIGENT SNAPSHOT TIERING

BACKGROUND

The disclosure generally relates to the field of data processing, and more particularly to multicomputer data transferring.

An organization can specify a data management strategy in a policy(ies) that involves data recovery and/or data retention. For data recovery, an application or program creates a backup and restores the backup when needed. The Storage Networking Industry Association (SNIA) defines a backup as a "collection of data stored on (usually removable) non-volatile storage media for purposes of recovery in case the original copy of data is lost or becomes inaccessible; also called a backup copy." For data retention, an application or program creates an archive. SNIA defines an archive as "A collection of data objects, perhaps with associated metadata, in a storage system whose primary purpose is the long-term preservation and retention of that data." Although creating an archive may involve additional operations (e.g., indexing to facilitate searching, compressing, encrypting, etc.) and a backup can be writable while an archive may not be, the creation of both involves copying data from a source to a destination.

This copying to create a backup or an archive can be done differently. All of a defined set of data objects can be copied, regardless of whether they have been modified since the last backup to create a "full backup." Backups can also be incremental. A system can limit copying to modified objects to create incremental backups, either a cumulative incremental backup or a differential incremental backup. SNIA defines a differential incremental backup as "a backup in which data objects modified since the last full backup or incremental backup are copied." SNIA defines a cumulative incremental backup as a "backup in which all data objects modified since the last full backup are copied."

A data management/protection strategy can use "snapshots," which adds a point in time aspect to a backup. A more specific definition of a snapshot is a "fully usable copy of a defined collection of data that contains an image of the data as it appeared at a single instant in time." In other words, a snapshot can be considered a backup at a particular time instant. Thus, the different techniques for creating a backup can include different techniques for creating a snapshot. The SNIA definition further elaborates that a snapshot is "considered to have logically occurred at that point in time, but implementations may perform part or all of the copy at other times (e.g., via database log replay or rollback) as long as the result is a consistent copy of the data as it appeared at that point in time. Implementations may restrict point in time copies to be read-only or may permit subsequent writes to the copy."

An organization can use different backup strategies. A few backup strategies include a "periodic full" backup strategy and a "forever incremental" backup strategy. With the periodic full backup strategy, a backup application creates a full snapshot ("baseline snapshot") periodically and creates incremental snapshots between the periodically created full snapshots. With the forever incremental backup strategy, a backup application creates an initial snapshot that is a full snapshot and creates incremental snapshots thereafter.

Data management/protection strategies increasingly rely on cloud service providers. A cloud service provider maintains equipment and software without burdening customers with the details. The cloud service provider provides an application programming interface (API) to customers. The API provides access to resources of the cloud service provider without visibility of those resources. Many data management/protection strategies use storage provided by a cloud service provider(s) ("cloud storage") to implement tiered storage. SNIA defines tiered storage as "Storage that is physically partitioned into multiple distinct classes based on price, performance or other attributes. Data may be dynamically moved among classes in a tiered storage implementation based on access activity or other considerations."

BRIEF DESCRIPTION OF THE DRAWINGS

Embodiments of the disclosure may be better understood by referencing the accompanying drawings.

DESCRIPTION

Figure 1:
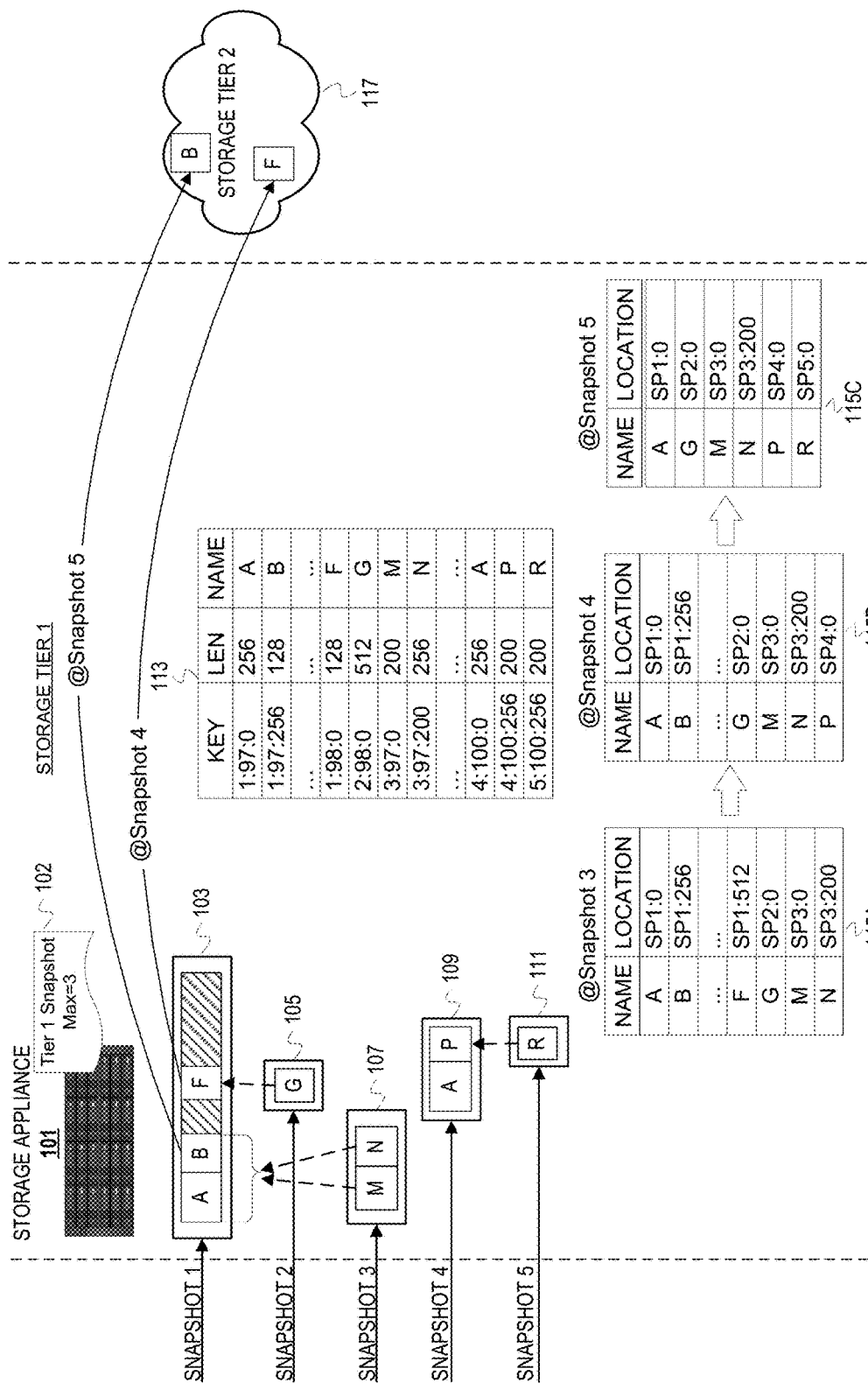
FIG. 1 is a conceptual diagram of a storage appliance migrating invalidated blocks of snapshots across storage tiers based on a policy.

The description that follows includes example systems, methods, techniques, and program flows that embody aspects of the disclosure. However, it is understood that this disclosure may be practiced without these specific details. For instance, this disclosure refers to data blocks in illustrative examples. However, units of data can be shared across files/objects at a different granularity or have different monikers (e.g., data segments, data extents, etc.). In other instances, well-known instruction instances, protocols, structures and techniques have not been shown in detail in order not to obfuscate the description.

Introduction

A data strategy is carried out by a "solution" that includes one or more applications, which will be referred to herein as a data management application. The data management application can run on a storage operating system (OS) that is installed on a device (virtual or physical) that operates as an intermediary between a data source(s) and cloud storage. A data management application that uses snapshots effectively has 2 phases: 1) creation of snapshots over time, and 2) restoring/activating a snapshot(s).

The data management application creates a snapshot by copying data from a data source, which may be a primary or secondary storage (e.g., backup servers), to a storage destination. This storage destination can be a storage appliance between the data source and private or public cloud storage (i.e., storage hosted and/or managed by a cloud service provider). "Storage appliance" refers to a computing machine, physical or virtual, that provides access to data and/or manages data without requiring an application context. Managing the data can include securing the data, deduplicating data, managing snapshots, enforcing service level agreements, etc. The storage appliance is the destination for the snapshots from the perspective of the data source, but operates as an initial storage point or cache for snapshots to be ultimately stored in cloud storage. A snapshot that has not been migrated from the storage appliance can be expeditiously restored from the storage appliance and/or storage devices managed directly by the storage appliance. The storage appliance can also efficiently respond to at least metadata related requests because the storage appliance maintains metadata for snapshots, both cached and migrated snapshots.

A data strategy can define rules and/or conditions to migrate snapshots that expire in one storage tier to another storage tier. Typically, a first storage tier will be implemented with a storage class that at least allows for the fastest restore relative to the other storage tiers. For instance, a first storage tier may be implemented with an on-premise storage appliance. Each successive storage tier can be implemented with cloud storage classes that have increasing durability and increasing retrieval latency. In addition, the cost of storage can decrease with each successive class of storage while the cost of access increases. In this context, migration of a baseline snapshot or snapshot that includes numerous updates can be costly in multiple terms: network bandwidth is consumed transferring the data blocks to the new storage tier and many of those blocks may need to be retrieved to restore a different snapshot.

Overview

Intelligent snapshot tiering facilitates efficient management of snapshots and efficient restore of snapshots. For intelligent snapshot tiering, a storage appliance can limit cross-tier migration to invalidated data blocks of a snapshot instead of an entire snapshot. Based on a policy, a storage appliance can identify a snapshot to be migrated to another storage tier and then determine which data blocks are invalidated by an immediately succeeding snapshot. This would limit network bandwidth consumption to the invalidated data blocks and maintain the valid data blocks at the faster access storage tier since the more recent snapshots are more likely to be restored.

Example Illustrations

FIG. 1 is a conceptual diagram of a storage appliance migrating invalidated blocks of snapshots across storage tiers based on a policy. A data source(s) sends snapshots of a dataset to a storage appliance 101. The vertical dashed lines in FIG. 1 mark conceptual boundaries for the storage appliance 101.

The storage appliance 101 receives a series of snapshots of a dataset over time. For this illustration, the storage appliance 101 identifies the snapshots according to a simple, incrementing numerical scheme. FIG. 1 depicts the storage appliance 101 receiving snapshots 1-5 for a dataset. The storage appliance 101 maintains metadata of the snapshots. This metadata at least includes metadata indicating snapshots that have been received, the valid data ranges of each snapshot, names of data blocks corresponding to the valid data ranges, and source identifiers of the data (e.g., inode numbers, file or directory names, offsets of data blocks in a source system, etc.). The names of the data blocks are assigned prior to receipt of the data blocks at the storage appliance 101. Although different implementations can organize the metadata differently, this example illustrates metadata indicating valid data ranges across snapshots arranged in a key-value store 113. The key for each entry in the store 113 is based on a snapshot identifier, an inode number of a file that contains a data block represented by the entry, a length of the data block represented by the entry, and a name of the data block. The inode numbers are inode numbers of a source file system and not inode numbers at the storage appliance 101.

Each data block name uniquely identifies a data block within a defined dataset (e.g., file system instance, volume, etc.). A data management application or storage OS names data blocks and communicates those names to the storage appliance when backing up to or through the storage appliance. The requestor (e.g., data management application or storage OS) that performs deduplication on the defined dataset generates identifiers or names for data blocks that can be shared across files and/or recur within a file. Naming of these data blocks can conform to a scheme that incorporates information in order for the generated names to at least imply an order. For example, the requestor may generate names based on a data block fingerprint (e.g., hash value) and time of data block creation and assign the combination (e.g., concatenation) of the fingerprint and creation time as the name for the data block. As another example, the requestor may generate a name with a monotonically increasing identifier for each unique data block.

This example also illustrates data map metadata ("data map") that indicates locations of named data blocks on the storage appliance 101. In FIG. 1, a data map is illustrated as it changes based on receipt of snapshots that trigger a policy evaluation. FIG. 1 depicts these three different data map instances as data map 115A corresponding to receipt of snapshot 3, data map 115B corresponding to receipt of snapshot 4, and data map 115C corresponding to snapshot 5. The data maps 115A-115C indicate locations of named data blocks within files on the storage appliance 101. Although embodiments can store and arrange the data blocks differently, this example illustration presumes that the storage appliance 101 writes data blocks of each snapshot to a data file corresponding to the snapshot, unless a data blocks is already in another data file of another snapshot. Thus, SP1:0 and SP1:256 in the data map 115A indicate, respectively, that data block A can be found at an offset of 0 in a data file identified as SP1 on the storage appliance 101 and that data block B can be found at an offset 256 in that data file SP1. In this illustrated implementation, a data block name is removed from the data map when migrated to a different storage tier. The absence of a data block name causes the storage appliance 101 to query a cloud storage service associated with the defined dataset (e.g., account information) to determine locations of named data blocks. The storage appliance 101 can invoke a function defined by a cloud storage provider (e.g., application programming interface (API) function) to list the data blocks in cloud storage or query on the data block name to determine whether the data block name is in cloud storage. Although other metadata can be maintained at the storage appliance 101 for snapshots, the valid data ranges metadata and the data map are sufficient to describe an example of intelligent snapshot tiering.

As previously stated, FIG. 1 depicts the storage appliance 101 receiving a series of 5 snapshots: a snapshot 103 (snapshot 1), a snapshot 105 (snapshot 2), a snapshot 107 (snapshot 3), a snapshot 109 (snapshot 4), and a snapshot 111 (snapshot 5). Each of the snapshots is represented by a rectangle within a rectangle. This rectangle within a rectangle corresponds to a snapshot having both metadata for a dataset and data of the dataset—the outer rectangle conceptually representing the dataset metadata and the inner rectangle representing an aggregation of the data blocks of the dataset. A policy 102 defines maximum or threshold number of most recent snapshots to preserve in storage tier 1 as 3. Accordingly, the storage appliance 101 will limit storage tier 1 to 3 snapshots. Based on receipt of the snapshot 103, the storage appliance 101 updates the store 113 to indicate the content of snapshot 103. The snapshot 103 at least includes named data blocks A, B, and F for files identified by inode numbers 97 and 98. The storage appliance 101 updates the key-value store 113 to indicate data ranges for these files. The named data block A corresponds to the first data range for the file (inode 97) at a source offset 0 and with a length of 256 bytes. The named data block B corresponds to another data range for the file (inode 97) at a source offset 256 and with a length of 128 bytes. The named data block F corresponds to the first data range for the file (inode 98) at a source offset 0 and with a length of 128 bytes. Based on receipt of the snapshot 105 (snapshot 2), the storage appliance 101 update the key-value store 113 with an entry for a named data block G. The snapshot 105 indicates a data range in inode 98 from source offset 0 with a length of 512 bytes, which correspond to the data block G. This data block G overwrites/invalidates data block F for the time corresponding to snapshot 2. Based on receipt of the snapshot 107 (snapshot 3), the storage appliance 101 adds more entries to the key-value store 113 for inode 97. In snapshot 3, a data block M overwrites part of data block A and a data block N overwrites a remainder of data block A and data block B. The data block M corresponds to inode 97 at source offset 0 for a length of 200 bytes and the data block N is at source offset 200 with a length of 256 bytes, for the same inode. After receipt of snapshot 3, the data map 115A indicates the locations of data blocks of snapshots 1-3. The data block locations are: A is in a data file for snapshot 1 ("SP1") at offset 0; B is in SP1 at offset 256; F is in SP1 at offset 512; G is in a data file for snapshot 2 ("SP2") at offset 0; M is in a data file for snapshot 3 ("SP3") at offset 0; and N is in SP3 at offset 200. Although this example refers to a storage appliance organizing data blocks into data files for each snapshot, embodiments are not so limited. An embodiments may organize named data blocks into one or more files, write the named data blocks at various locations of storage media corresponding to the type of storage media with logical block addressing without out a filesystem hierarchy, etc.

With the receipt of the snapshot 109 (snapshot 4), the storage appliance 101 determines that the threshold of 3 snapshots defined by the policy 102 will be exceeded. To comply with the policy 102, the storage appliance 101 selects an oldest snapshot in storage tier 1 to evict or migrate to a different storage tier. In this case, the oldest snapshot is snapshot 1. The storage appliance 101 migrates snapshot 1 to a storage tier 2 117, which is implemented in cloud storage. The storage appliance 101 can select storage tier 2 by default (e.g., next higher tier with respect to tier 1) or the policy 102 may specify tier 2 as the migration target. Migration of snapshot 1, however, does not require migration of all constituent data blocks. The storage appliance 101 determines data blocks of the snapshot 1 that are invalidated by snapshot 2, which is the data block F. The storage appliance 101 then migrates (i.e., stores) the data block F to the storage tier 2 117. The storage appliance 101 removes the entry for the data block F from the data map to generate the data map 115B. This implicitly indicates that the data block F has been migrated off of storage tier 1.

With the receipt of the snapshot 111 (snapshot 5), the storage appliance 101 determines that another snapshot is to be migrated out of the storage tier 1 to comply with the policy 102. The storage appliance 101 identifies the snapshot 2 as the oldest snapshot in storage tier 1. The snapshot 111 includes a data block R that invalidates a data block P of the snapshot 109 (snapshot 4), but this data blocks is for a snapshot still within the snapshot preservation window for tier 1 (i.e., within the 3 most recent snapshots). The storage appliance 101 determines data blocks of the snapshots 1 and 2 that are invalidated by snapshot 3. In this case, the data block B of snapshot 1 is invalidated because the corresponding data range is overwritten with data block N in snapshot 3. Although the data range in snapshot 1 corresponding to data block A are overwritten in snapshot 3 with data block M and part of data block N, data block A also occurs in snapshot 4. Therefore, the storage appliance 101 determines that data block A is not invalidated. The storage appliance 101 then migrates the data block B to the storage tier 2 117, and removes the corresponding entry for the data block B from the data map to generate the data map 115C. This implicitly indicates that the data blocks B has been migrated off of storage tier 1.

The reduction in bandwidth consumption from the example illustration of intelligent snapshot tiering should be evident from FIG. 1. For instance, the valid blocks of snapshot 1 expired from tier 1 (depicted with hashing) have not been migrated off of storage tier 1. This avoids consuming both network bandwidth for transmission of these valid data blocks and the computing resources for handling the communications. If a restore request is received by the storage appliance 101, the valid data blocks of snapshot 1 are still available in storage tier 1, which provides faster access than storage tier 2. The restore would be more efficient because the valid data blocks represented by the hashing could be supplied more quickly from tier 1 than tier 2 and resources are not consumed to obtain those valid data blocks from a different storage tier.

Figure 2:
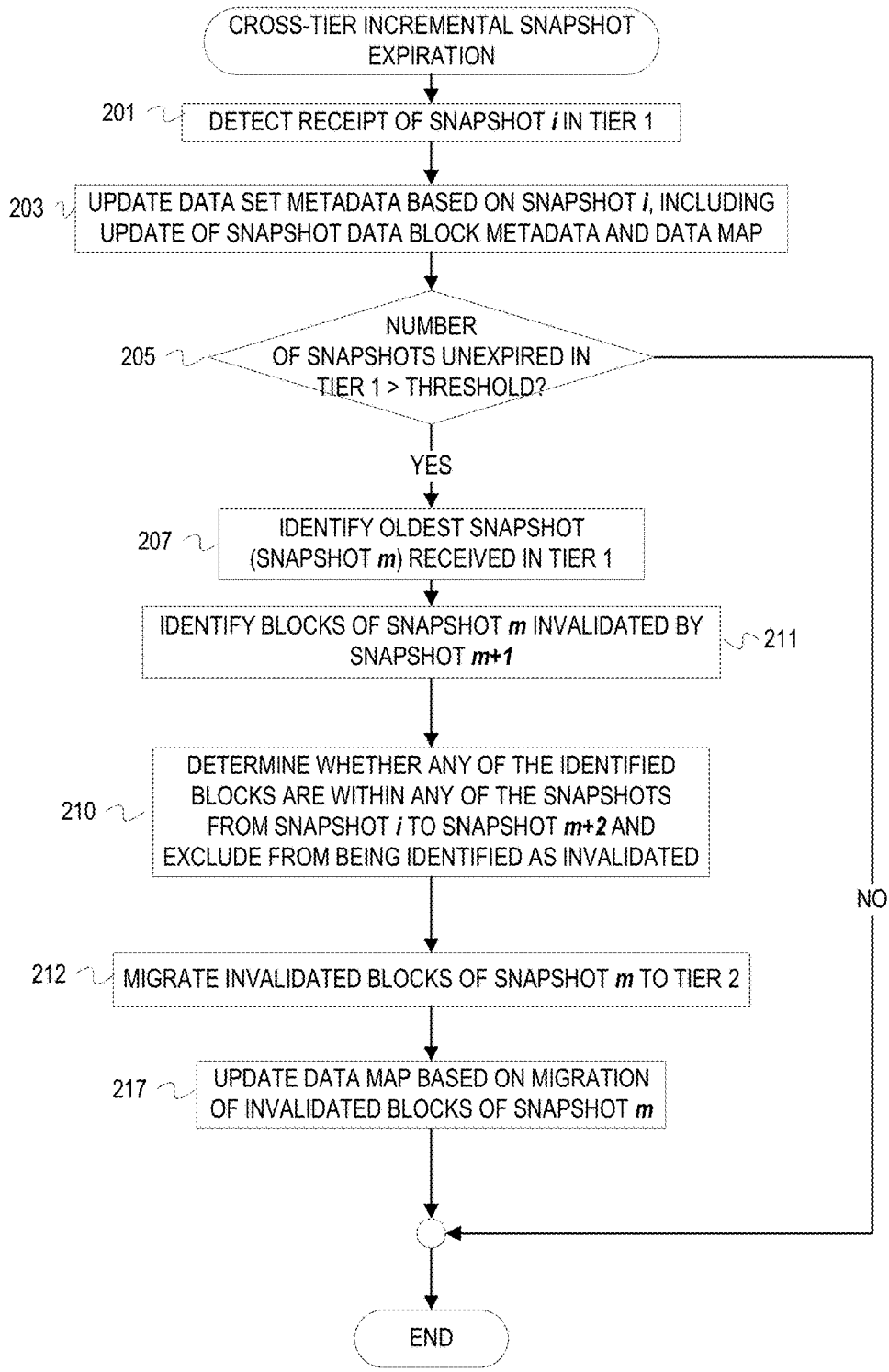
FIG. 2 is a flowchart of example operations for incremental snapshot expiration from a first storage tier to a second storage tier.

FIG. 2 is a flowchart of example operations for incremental snapshot expiration from a first storage tier to a second storage tier. A data management application (e.g., one or more applications for cloud storage backup) determines whether to migrate invalidated data blocks based on receipt of a snapshot from a source. This at least includes selecting the snapshot that is expiring from the first storage tier, determining invalidated data blocks of the expiring snapshot, and updating metadata.

At block 201, a data management application detects receipt of a snapshot i in a storage tier 1. The data management application is likely hosted on a storage appliance that manages a storage array implementing the storage tier 1.

At block 203, the data management application updates dataset metadata based on the snapshot i. This includes updating snapshot data block metadata that indicates the data ranges of the snapshot i. Updating the dataset metadata also includes updating a data map. The data management application maintains a data map that indicates locations of data blocks. The data management application adds entries for data blocks of snapshot i not already represented in the data map.

At block 205, the data management application determines whether a number of snapshots unexpired in tier 1 exceeds a defined threshold or falls outside of a snapshot preservation window for tier 1. Since valid data blocks of a snapshot can remain in storage tier 1 despite a policy indicating that the snapshot expires from tier 1, referring to this partial migration of a snapshot as expiring, evicting, or migrating the snapshot may not be accurate unless all of the data blocks are invalidated. Instead, the partial migration of a snapshot can be referred to as "incremental expiring" or "incremental migration" of a snapshot from the tier. Since snapshots can incrementally expire from a storage tier, the data management application can maintain a counter for the number of snapshots still resident in storage tier 1 or unexpired. When a snapshot is received, then the data management application increments the counter. When the counter exceeds the defined threshold, the data management application decrements the counter after identifying any invalidated data blocks of the oldest snapshot. If the threshold is exceeded by receipt of snapshot i, then control flows to block 207. Otherwise, the flow ends.

At block 207, the data management application identifies the oldest snapshot that has not at least incrementally expired from tier 1. This identified snapshot will be referred to as snapshot m. If a threshold or a preservation window size is defined as x, then m=i-x, assuming snapshot identifiers that reflect order of the snapshots.

At block 211, the data management application identifies data blocks of snapshot m that are invalidated by a succeeding snapshot (snapshot m+1). The data management application reads the snapshot metadata to determine data ranges of snapshot m overwritten by data ranges in snapshot m+1 or deleted in snapshot m+1. Indications of deletions per snapshot are also communicated to the data management application. The data management application then identifies the data blocks corresponding to the overwritten or deleted data ranges and determines these to be invalidated data blocks. In incremental expiration, a previously valid data block of an incrementally expired snapshot may later become invalidated. Therefore, the valid data blocks of an incrementally expired snapshot can be considered as rolled into the succeeding snapshot as if a synthetic baseline is logically created. Thus, a data block of snapshot m may have been part of a snapshot m−1, but is now logically considered as rolled into snapshot m.

At block 210, the data management application determines whether any of the data blocks identified as invalidated by snapshot m+1 are within any of the snapshots from snapshot i to snapshot m+2. If a data block is referenced again in a snapshot being maintained at the storage appliance, then it should not be migrated. The data management application can traverse the snapshot metadata for the snapshots more recent than the snapshot m+1, and compare against the list of data blocks identified as invalidated. Each of the data blocks identified as invalidated by snapshot m+1 that is referenced by the more recent snapshots is removed from the list of data blocks identified as invalidated by snapshot m+1.

At block 212, the data management application migrates invalidated data blocks of snapshot m to storage tier 2. The data management application invokes remote procedure calls or API functions defined by the cloud storage service to store the invalidated data blocks into the storage tier 2, assuming storage tier 2 is implemented with a cloud storage service. The data management application stores these invalidated data blocks into the storage tier 2 with object names that correspond with the data block names. As examples, the data management application at least partially encodes the data blocks names into the object names or derives the object names from the data block names. This allows the data management application to query the storage tier 2 based on the data block names. The data management application then removes the invalidated data blocks from storage tier 1 (e.g., frees the space, deletes the blocks, or marks the blocks for deletion).

At block 217, the data management application updates the data map based on the migration of invalidated data blocks. The data management application can remove entries from the data map that represent the migrated data blocks as described with reference to FIG. 1, or can maintain other metadata to indicate locations of data blocks migrated off of storage tier 1. For example, the data management application can maintain metadata that indicates the data blocks residing in storage tier 2 instead of relying on the implicit indication by absence of an entry in the data map. The data management application can maintain a separate structure for migrated data blocks or update data map entries for migrated data blocks to identify the appropriate storage tier.

Figure 3:
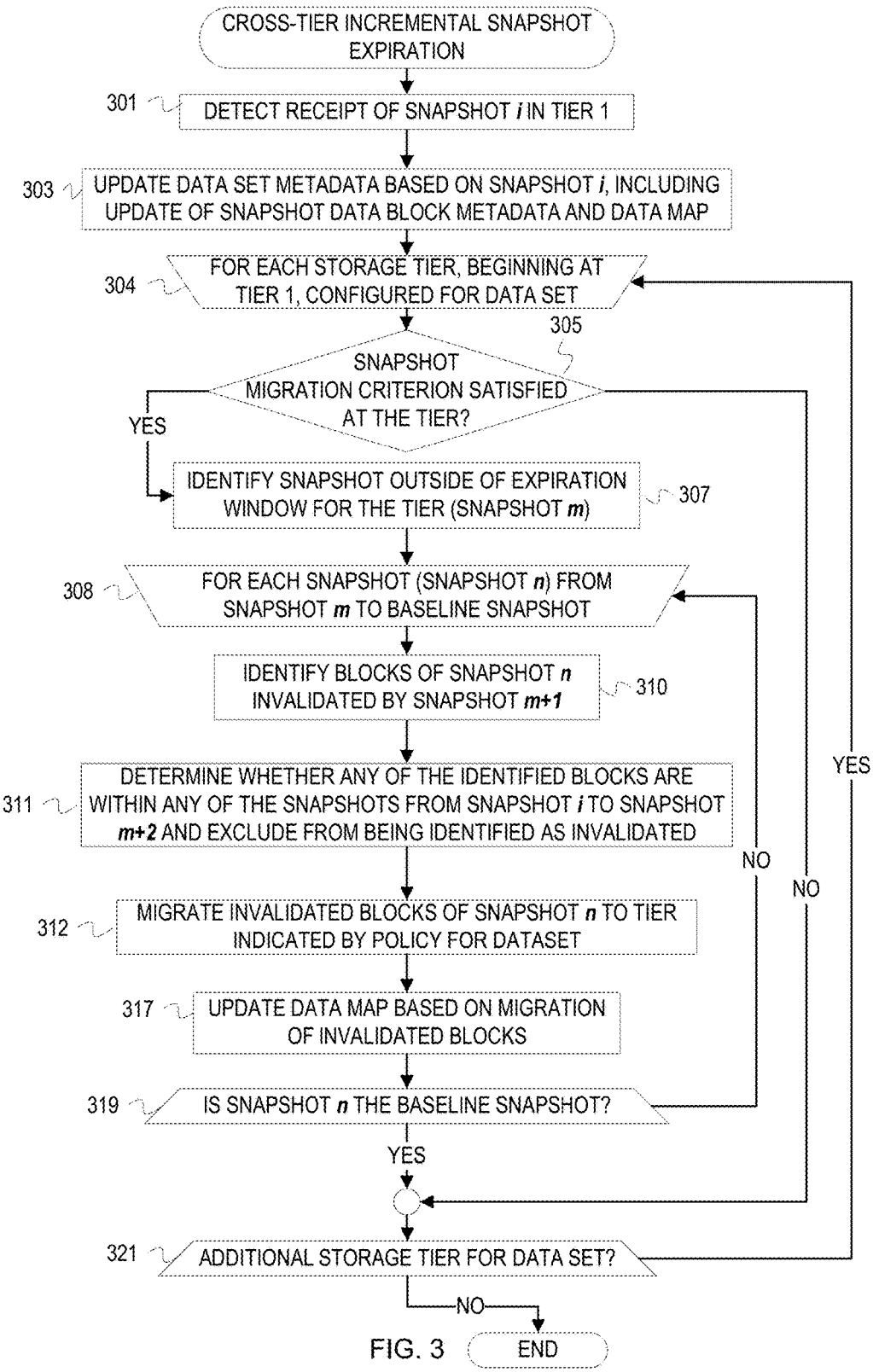
FIG. 3 is a flowchart of example operations for cross-tier incremental snapshot expiration.

FIG. 3 is a flowchart of example operations for cross-tier incremental snapshot expiration. This flowchart has similar operations as FIG. 2, but expands upon the flowchart of FIG. 2 by encompassing more than 2-tiered storage for a dataset and scanning across multiple preceding snapshots that may still partially reside on in tier 1. The description of FIG. 3 refers to a data management application performing the example operations for consistency with FIG. 2.

At block 301, a data management application detects receipt of a snapshot i in a storage tier 1 for a dataset. The detection may be via messaging, detection of a storage event, etc. The data management application is likely hosted on a storage appliance that manages a storage array implementing the storage tier 1.

At block 303, the data management application updates dataset metadata based on the snapshot i. This includes updating snapshot data block metadata that indicates the data ranges of the snapshot i. Updating the dataset metadata also includes updating a data map. The data management application adds entries for data blocks of snapshot i not already represented in the data map.

At block 304, the data management application begins operations for each storage tier configured for the dataset, starting from storage tier 1. As an example, a policy can be defined for a dataset that specifies how data of the dataset is migrated across 4 tiers of storage. The data management application will evaluate each storage tier against the rules/conditions of the policy since migration from tier 1 to tier 2 can trigger additional downstream migrations (e.g., migration of data blocks from tier 2 to tier 3). The description refers to the current tier being evaluated as the selected tier.

At block 305, the data management application determines whether a snapshot migration criterion for the selected tier is satisfied. As previously, discussed this can be a defined threshold evaluated against a counter maintained for each tier by the data management application. The criterion can be implemented as a preservation window. For instance, a snapshot preservation window size of z may be defined for each storage tier. If a snapshot i-z exists, then the criterion is satisfied for a preservation window based criterion. If the criterion is satisfied for the selected storage tier, then control flows to block 307. Otherwise, the flow continues to blocks 321.

At block 307, the data management application identifies the snapshot that is no longer within the preservation window for the selected storage tier. This identified snapshot will be referred to as snapshot m=i−z.

At block 308, the data management application begins operations for each snapshot (snapshot n) from snapshot m to an actual baseline or synthetic baseline snapshot. The data management application can maintain additional metadata that identifies a synthetic baseline(s). A data management application that implements forever incremental snapshotting may default to an oldest snapshot as a baseline snapshot. The data management application performs these operations to determine data blocks of the snapshots outside of the preservation window are invalidated by snapshot m+1. This can be considered as logically rolling up valid data blocks of older snapshots into snapshot m+1.

At block 310, the data management application determines whether any data blocks of snapshot n are invalidated by the snapshot m+1. The data management application reads the snapshot metadata to determine data ranges of snapshot n overwritten by data ranges in snapshot m+1 or deleted in snapshot m+1. The data management application then identifies the data blocks corresponding to the overwritten or deleted data ranges and determines these to be invalidated data blocks. A data management application can be configured to achieve different degrees of incremental expiring.

At block 311, the data management application determines whether any of the data blocks identified as invalidated by snapshot m+1 are within any of the snapshots from snapshot i to snapshot m+2. If a data block is referenced again in a snapshot being maintained at the storage appliance, then it should not be migrated. The data management application can traverse the snapshot metadata for the snapshots more recent than the snapshot m+1, and compare against the list of data blocks identified as invalidated. Each of the data blocks identified as invalidated by snapshot m+1 that is referenced by the more recent snapshots is removed from the list of data blocks identified as invalidated by snapshot m+1.

At block 312, the data management application migrates invalidated data blocks of snapshot n to a storage tier specified by a controlling policy. Most likely the data management application migrates the invalidated data blocks to the next level storage tier. However, policies can be defined with other factors to influence which storage tier is the destination.

At block 317, the data management application updates the data map based on the migration of invalidated data blocks. The data management application can remove entries from the data map that represent the migrated data blocks as previously described, or can maintain other metadata to indicate locations of data blocks migrated off of the selected storage tier 1.

At block 319, the data management application determines whether snapshot n is a baseline or synthetic baseline snapshot. If it is, then control flows to block 321. If it is not, then control returns to block 308.

At block 321, the data management application determines whether there is an additional storage tier for the dataset. If another storage tier was configured for the dataset, then control flows to block 304. Otherwise, the process ends.

Figure 4:
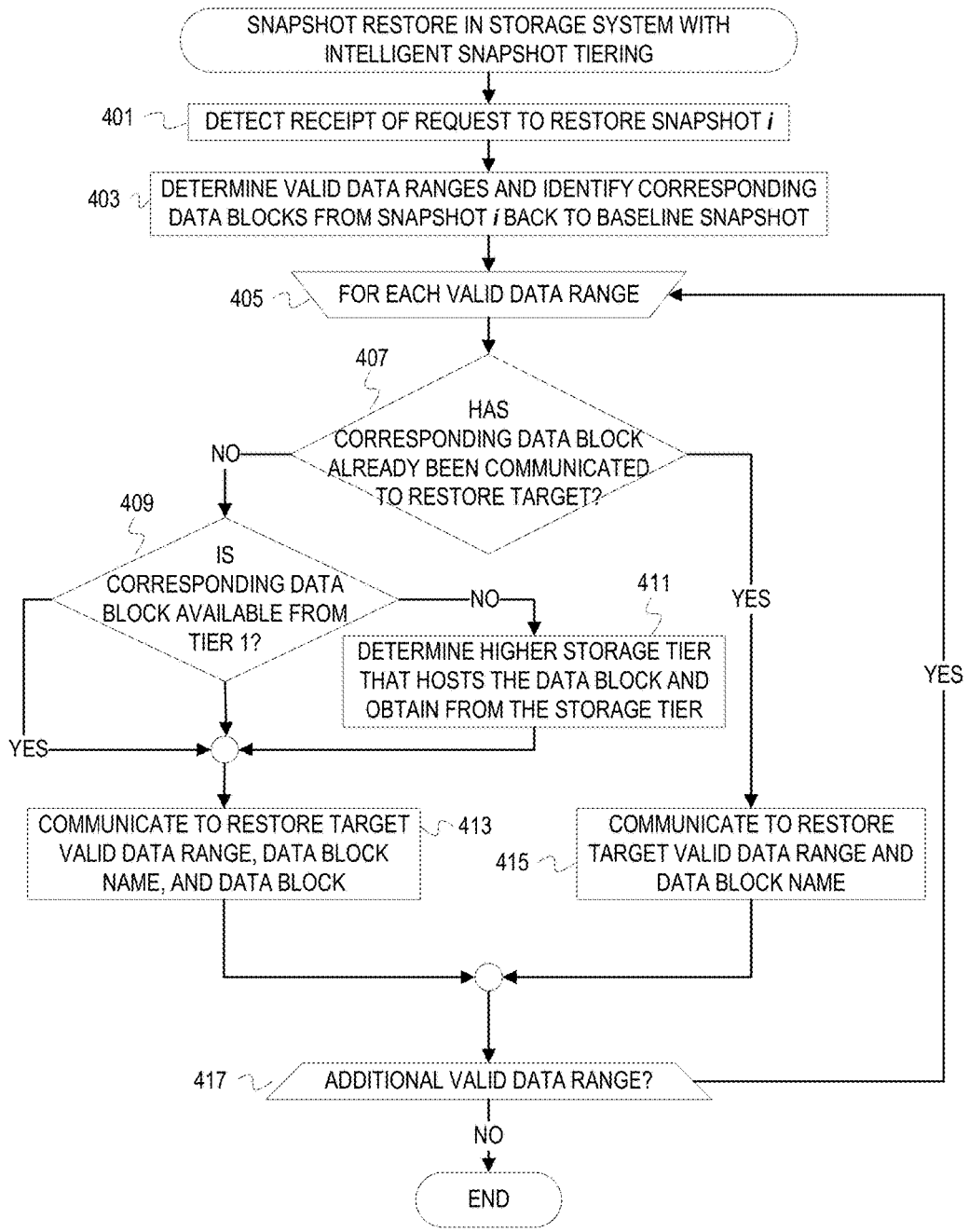
FIG. 4 is a flowchart of example operations for restoring a snapshot in a storage system that implements intelligent snapshot tiering.

FIG. 4 is a flowchart of example operations for restoring a snapshot in a storage system that implements intelligent snapshot tiering. With intelligent snapshot tiering that incrementally expires snapshots, a data management application can obtain data blocks at lower storage tiers for snapshot restore than expected based on snapshot expiration specified by a policy.

At block 401, a data management application detects receipt of a request to restore a snapshot i. The data management application receives the request from an instance of a storage OS or another data management application (e.g., backup application) running on another machine (physical or virtual) than the data management application. Although the requestor can be the target of the restore, the restore request can indicate a restore target other than the requestor, for example by network address or device name.

At block 403, the data management application determines the valid data ranges for files based on snapshot i. The data management application also determines named data blocks corresponding to the valid data ranges. Since the dataset is deduplicated, a data block can be shared across files and repeat within a file. To determine the valid data ranges, the data management application searches through the snapshot metadata to determine which data ranges have not been overwritten. The data management application begins searching the snapshot metadata from snapshot i back to a baseline snapshot (actual or synthetic). As part of determining validity, data ranges from older snapshots may be disregarded, truncated, or split based on overlap with data ranges of more current snapshots. The data management application can generate a listing of the data block names corresponding to the determined valid data ranges.

At block 405, the data management application begins operations for each valid data range that has been determined. For each valid data range, the data management application performs operations to obtain a named data block and communicate the valid data range and data block, if not already communicated. The description refers to a valid data range of a current iteration as a selected data range.

At block 407, the data management application determines whether the data block corresponding to the selected data range has already been communicated to the restore target. The data management application can communicate valid data ranges and identities of corresponding data blocks at multiple points during the restore and at different granularities. For instance, the data management application can communicate mappings of valid data ranges and data block names for each directory being restored, for every n files, etc. In addition to the mappings, the data management application sends or communicates the data block itself to the restore target unless already sent. After the initial send, the restore target can use the data block available in local storage. The data management application tracks the data blocks communicated to the restore target. If the data block identified as corresponding to the valid data range has already been communicated to the restore target, then control flows to block 415. If it has not, then control flows to block 409.

At block 409, the data management application determines whether the identified data block corresponding to the valid data range is available in storage tier 1. Assuming storage tier 1 is the tier with lowest access latency, the data management application determines whether the data block can be obtained in this lowest access latency tier. If it is available in tier 1, then control flows to block 413. If the data block is not available in tier 1 and has migrated to a different storage tier, then control flows to block 411.

At block 411, the data management application determines which (higher level) storage tier hosts the identified data block and obtains the identified data block from that storage tier. The data management application can determine an account associated with the dataset indicated in the restore request. The account will identify the other storage tiers configured for the account and/or identify a policy(ies) that indicates the storage tiers configured for the dataset. With the account information, the data management application can query the storage services to determine whether the identified data block is available. The data management application can use an inexpensive function call defined by the storage service to obtain a listing of data block identifiers of the dataset within each storage tier or can iterate over storage tiers until the identified data block is found. The data management application can also use a function call that requests metadata of an object with an object identifier or object key in the storage tier implemented in the cloud storage service that corresponds to the identified data block name. For instance, the data management application can communicate a request to a storage service that specifies an object name "OBJECT_A" for a data block named "A." Instead of the object itself, the storage service either returns the metadata for OBJECT_A or a code indicating the absence of such an object. If not found, the data management application can send the same request to the next storage tier, which may be identified with a different container name. Embodiments may maintain metadata identifying which storage tier hosts which data blocks. In that case, the data management application can perform a lookup on this metadata that maps data block names to storage tiers and retrieve the data block accordingly. After obtaining the identified data block, control flows to block 413.

At block 413, the data management application communicates to the restore target the information for the valid data range. The data management application communicates the determined valid data range, the data block name, and the obtained data block. Embodiments can aggregate communication of the valid data range information at varying granularities (e.g., communicate valid data ranges for all files within a subdirectory instead of each valid data range). After communicating the valid data range information, the data management application determines whether there is another valid data range for the restore at block 417.

If the identified data block had already been sent to the restore target (407), then the data management application communicates to the restore target the valid data range and the data block name at block 415. As previously mentioned, the data management application can forgo redundantly sending the data block since the data block has already been sent to the restore target. Control flows from block 415 to 417. For some data ranges, the valid portion of the data range will be less than the entire named data block referenced by the data range in the snapshot metadata. The mapping will still be communicated to the restore target and the restore target will determine the portion of the named data block to use. This allows the restore target to use the named data block across multiple valid data ranges and/or files despite the different portion of the named data block being valid for the different ranges/or files.

Variations

The above example illustrations determine a data block to be invalidated based on a corresponding data range being overwritten. This preserves data blocks in lower storage tiers for more efficient restore even when partially overwritten. However, embodiments are not limited to requiring complete overwrite of a data block to migrate the data block. A data management application can be configured to characterize data blocks partially overwritten as invalidated. Although treating partially overwritten data blocks as overwritten likely leads to more data blocks being migrated to higher tiers less efficiencies than limiting invalidation to completely overwritten and deleted data blocks, it still obtains efficiencies over migration of entire snapshots.

The example illustrations suggest evaluating a migration criterion based on receipt of each snapshot at a storage appliance. However, embodiments are not so limited. A data management application can be configured to evaluate the migration criterion after a specified time period or after receipt of a x snapshots. This can be utilized in a system that has additional migration criteria. For instance, migration of data blocks of snapshots outside of a preservation window can be migrated when n snapshots have been restored and available storage capacity of the storage appliance falls below a threshold. The storage appliance and/or data management application will migrate data blocks according to the policy(ies) defined for a dataset(s). Moreover, embodiments can trigger migration evaluation with techniques other than a defined threshold and maintaining a counter. Embodiments can determine whether determine valid ranges from an oldest snapshot within an expiration window across other snapshot indicated in snapshot metadata of the storage appliance. Instead of maintaining a counter, the storage appliance can select oldest snapshot within the preservation window and then begin determining valid data ranges based on the selected snapshot.

The examples often refer to a "data management application." The data management application is a moniker used to refer to implementation of functionality for intelligent snapshot tiering. This moniker is utilized since numerous labels can be used for the program code(s) that performs the described functionality. In addition, modularity of the program code can vary based on platform, programming language(s), developer preferences, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, embodiments do not necessarily migrate invalidated data blocks as each is identified (312 of FIG. 3). Embodiments can track invalidated data blocks in a structure and then migrate multiple invalidated data blocks at a time, and update the data map accordingly. Embodiments are also not required to determine whether a potentially invalidated data block recurs in a more recent snapshot (e.g., block 210 of FIG. 2 and block 311 of FIG. 3). Data blocks may not be shared if deduplication is not performed on a data set, which then removes the possibility of a data block across snapshots having a same name. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
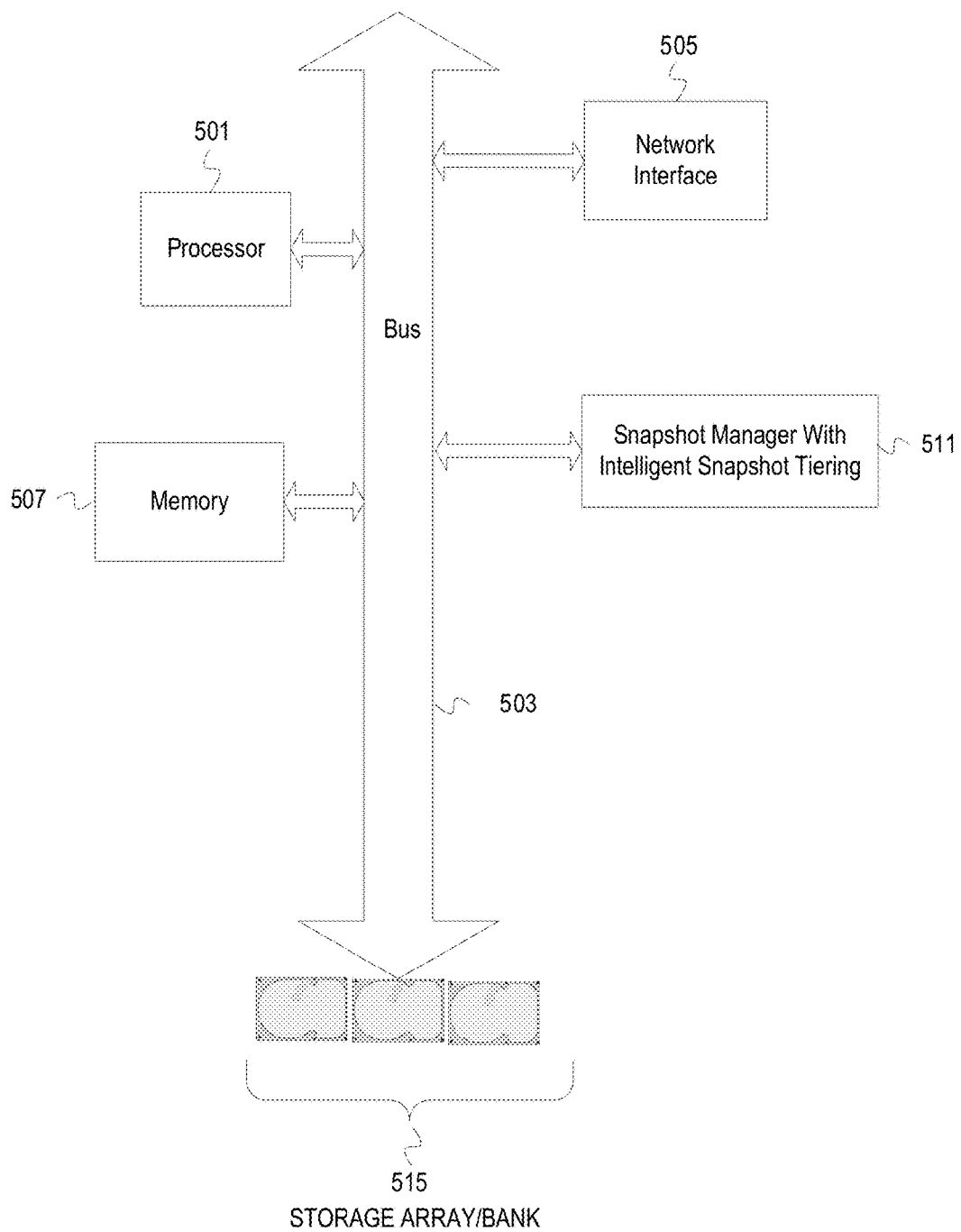
FIG. 5 depicts an example computer system with intelligent snapshot tiering.

FIG. 5 depicts an example computer system with intelligent snapshot tiering. The computer system includes a processor 501 (possibly including multiple processors, multiple cores, multiple nodes, and/or implementing multithreading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a snapshot manager 511 with intelligent snapshot tiering. The snapshot manager 511 incrementally migrates data blocks of snapshots that age out of an expiration window. The snapshot manager 511 incrementally migrates snapshot by limiting migration to invalidated data blocks. The snapshot manager 511 can initially storage snapshots and later retrieve data blocks from a storage array or storage bank 515 (e.g., disk array, flash storage bank, hybrid storage, etc.). Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for intelligent snapshot tiering as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    identifying, by a computing device, a first set of data blocks of a first point-in-time copy of a dataset invalidated by a second point-in-time copy of the dataset, wherein a first storage tier stores the first and second point-in-time copies and the first point-in-time copy precedes in time the second point-in-time copy;
    migrating, by the computing device, the invalidated first set of data blocks to a second storage tier; and
    updating, by the computing device, a data map to indicate that the first set of data blocks are no longer stored in the first storage tier.

2. The method of claim 1 further comprising excluding, by the computing device, one or more of the first set of data blocks that are within a third point-in-time copy of the dataset from the migration, wherein the third point-in-time copy is more recent than the second point-in-time copy.

3. The method of claim 1, further comprising identifying, by the computing device, the first set of data blocks upon determining that n of point-in-time copies have been received since a previous migration of invalidated data blocks based on receipt of a third point-in-time copy, wherein the n point-in-time copies include the second and third point-in-time copies.

4. The method of claim 1 further comprising identifying, by the computing device and for each of one or more point-in-time copies of the dataset from the first point-in-time copy to a preceding-in-time baseline point-in-time copy of the dataset, a second set of data blocks invalidated by a third set of data blocks of the second point-in-time copy.

5. The method of claim 1, further comprising identifying, by the computing device, a second set of data blocks that map to a first set of data ranges of the first point-in-time copy at least partially overwritten by a second set of data ranges of the second point-in-time copy or deleted in the second point-in-time copy.

6. A non-transitory machine-readable medium having stored thereon instructions for intelligent snapshot tiering comprising machine executable code which when executed by at least one machine, causes the machine to:
   identify a first set of data blocks of a first point-in-time copy of a dataset invalidated by a second point-in-time copy of the dataset, wherein a first storage tier stores the first and second point-in-time copies and the first point-in-time copy precedes in time the second point-in-time copy;
   migrate the invalidated first set of data blocks to a second storage tier; and
   update a data map to indicate that the first set of data blocks are no longer stored in the first storage tier.

7. The machine-readable medium of claim 6, wherein the machine executable code when executed by the machine, further causes the machine to exclude one or more of the first set of data blocks that are within a third point-in-time copy of the dataset from the migration, wherein the third point-in-time copy is more recent than the second point-in-time copy.

8. The machine-readable medium of claim 6, wherein the machine executable code when executed by the machine, further causes the machine to identify the first set of data blocks upon determining that n of point-in-time copies have been received since a previous migration of invalidated data blocks based on receipt of a third point-in-time copy, wherein the n point-in-time copies include the second and third point-in-time copies.

9. The machine-readable medium of claim 6, wherein the machine executable code when executed by the machine, further causes the machine to identify, for each of one or more point-in-time copies of the dataset from the first point-in-time copy to a preceding-in-time baseline point-in-time copy of the dataset, a second set of data blocks invalidated by a third set of data blocks of the second point-in-time copy.

10. The machine-readable medium of claim 6, wherein the machine executable code when executed by the machine, further causes the machine to identify a second set of data blocks that map to a first set of data ranges of the first point-in-time copy at least partially overwritten by a second set of data ranges of the second point-in-time copy or deleted in the second point-in-time copy.

11. A computing device comprising:
   a memory containing a machine readable medium comprising machine executable code having stored thereon instructions for intelligent snapshot tiering; and
   a processor coupled to the memory, the processor configured to execute the machine executable code to cause the processor to:
      identify a first set of data blocks of a first point-in-time copy of a dataset invalidated by a second point-in-time copy of the dataset, wherein a first storage tier stores the first and second point-in-time copies and the first point-in-time copy precedes in time the second point-in-time copy;
      migrate the invalidated first set of data blocks to a second storage tier; and
      update a data map to indicate that the first set of data blocks are no longer stored in the first storage tier.

12. The computing device of claim 11, wherein the processor is further configured to execute the machine executable code to cause the processor to exclude one or more of the first set of data blocks that are within a third point-in-time copy of the dataset from the migration, wherein the third point-in-time copy is more recent than the second point-in-time copy.

13. The computing device of claim 12, wherein the processor is further configured to execute the machine executable code to cause the processor to identify the first set of data blocks upon determining that n of point-in-time copies have been received since a previous migration of invalidated data blocks based on receipt of a third point-in-time copy, wherein the n point-in-time copies include the second and third point-in-time copies.

14. The computing device of claim 11, wherein the processor is further configured to execute the machine executable code to cause the processor to identify, for each of one or more point-in-time copies of the dataset from the first point-in-time copy to a preceding-in-time baseline point-in-time copy of the dataset, a second set of data blocks invalidated by a third set of data blocks of the second point-in-time copy.

15. The computing device of claim 11, wherein the processor is further configured to execute the machine executable code to cause the processor to identify a second set of data blocks that map to a first set of data ranges of the first point-in-time copy at least partially overwritten by a second set of data ranges of the second point-in-time copy or deleted in the second point-in-time copy.

* * * * *